July 20, 1965   J. J. ADAMS   3,195,427
METHOD OF MANUFACTURING CONTAINERS
Filed Aug. 17, 1962
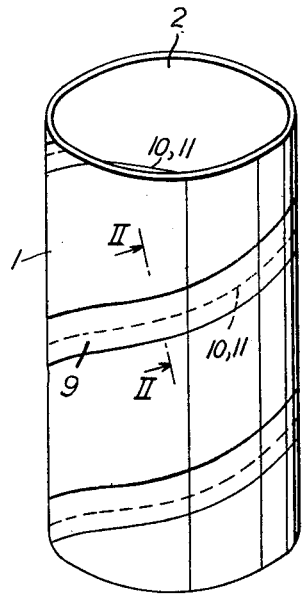
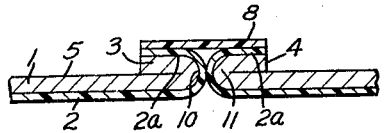
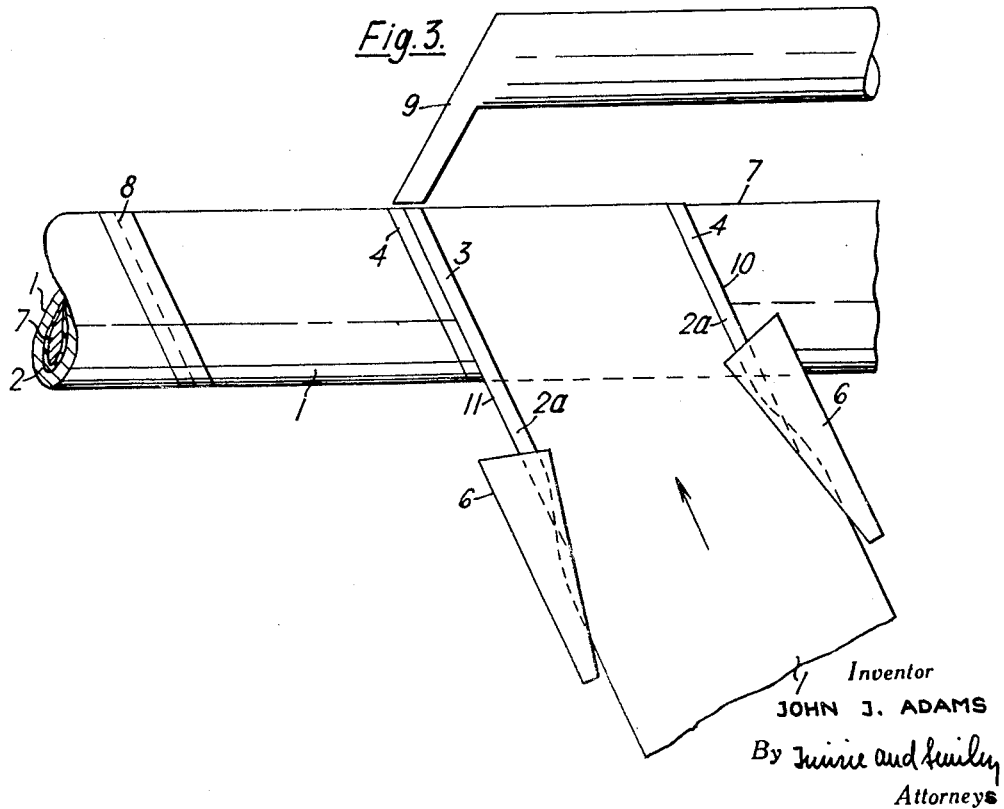
Inventor
JOHN J. ADAMS
By *Munn and Seiley*
Attorneys

United States Patent Office 3,195,427
Patented July 20, 1965

3,195,427
METHOD OF MANUFACTURING CONTAINERS
John J. Adams, Lymm, England, assignor to The Metal Box Company Limited, London, England, a British company
Filed Aug. 17, 1962, Ser. No. 217,612
Claims priority, application Great Britain, Sept. 15, 1961, 33,236
3 Claims. (Cl. 93—94)

This invention relates to containers and in particular to container bodies which are made from strip cardboard or paper one face of which is lined with a moisture-impervious material, for example organic thermoplastic material such as polyethylene or with a thin metal foil such as an aluminium foil.

Heretofore it has been usual in the manufacture from strip material of container bodies of the kind described above and in which the moisture-impervious material forms the interior of the body, particularly by helical winding of the strip, to form the seam of the body by causing marginal portions of the strip to overlap each other in a manner such that the lined face of one marginal portion overlies and is connected to the unlined face of the other of the marginal portions. This has rendered difficult the manufacture of consistently liquid-tight seams or joints and has necessarily entailed the contact of the contents of the container with raw or unlined edges of the cardboard strip.

Containers which are to be stored under refrigerated conditions, that is where the exterior of the container is required to be water impervious, sometimes have the bodies thereof made, usually by helical winding, from paper one side of which is laminated with a foil, for example aluminium foil, or with an organic thermoplastic. In such instances the foil or the thermoplastic is outermost and the seams are formed by overlying foil or film and paper portions so that it is possible for water on the exterior of the container to penetrate through the paper at the seam.

It is a main object of the present invention so to construct a container body of the kind above described that a seam or joint is sealed by an organic thermoplastic material extruded on to the body to cover the seam or joint in a manner such that when the liner is inside the body no unlined part of the cardboard strip is in contact with the contents of the container or when the liner is outside the body there can be no penetration into the body of moisture which may be on the surface of the body.

According to the invention there is provided the method of making a tubular container body from strip cardboard or paper one face of which is lined with a moisture-impervious liner, by helically winding the strip on to a forming mandrel and extruding organic thermoplastic material on to the tube to form a strip of the material which extends across and covers the helical seam formed by said winding.

The method may include the step of over-turning the marginal portions of the lined cardboard or paper as the strip is fed to the mandrel thereby to cause the marginal portions to overlie the unlined face of the strip prior to the extrusion of the organic thermoplastic material on to the lined faces of the over-turned marginal portions.

In order that the invention may be clearly understood some embodiments thereof will now be described, by way of example, with reference to the accompanying diagrammatic drawings, in which:

FIGURE 1 is a pictorial illustration of a helically wound container body according to the invention;

FIGURE 2 is a diagrammatic section on line II—II, FIGURE 1;

FIGURE 3 is a diagrammatic illustration of the method of making a body as illustrated in FIGURES 1 and 2;

In the drawing like reference numerals refer to like or similar parts.

Referring to the drawings, FIGURES 1 and 2 illustrate a tubular container body made of strip cardboard or paper 1 one face of which is lined with a liner 2 of moisture-impervious material such as a metal foil with a coating of organic thermoplastic material such as polyethylene. The body is formed by helically winding the strip material by any of the well known methods currently employed but before winding the longitudinal marginal portions 3, 4, FIGURE 2, of the strip are overturned so that they overlie the unlined face 5 of the cardboard strip, this being effected by folders 6, FIGURE 3, as the strip is fed on to a mandrel 7, by known means not shown. The lined face 2 of the strip is engaged with the mandrel and forms the interior of the container body and the unlined face 5 is outermost with the lined portions 2a of the marginal portions 3, 4 exposed. A cover 8 of organic thermoplastic material, preferably polyethylene, is extruded on to the portions 2a by an extrusion nozzle 9, FIGURE 3. The cover 8 extends lengthwise of and beyond the opposite sides of seam formed by the abutting edges 10, 11 of the wound strip and render the seam liquid-tight. As can be seen from FIGURE 2, when the strip is helically wound on the mandrel the liner covered edges 10, 11 are in substantially abutting relation and the liner portions 2a lie in a curved plane common thereto, although the curvature is not shown in FIGURE 2.

From FIGURE 2 it will be understood that a container body is so constructed that no unlined portion of the cardboard is contacted by the contents of a container which incorporates the body.

I claim:

1. The method of making a tubular container body from a base strip of cardboard, or paper, one face of which is lined with a moisture-impervious liner, comprising the steps of helically winding the base strip on to a forming mandrel while over-turning the marginal portions of the strip as it is being fed to the mandrel to cause said marginal portions to overlie the unlined face of the strip and form a helical seam having abutting edges, and extruding organic thermoplastic material on to said helical seam to form a sealing layer which extends along the helical seam and at least partially covers the lined faces of the over-turned strip marginal portions.

2. The method of making a tubular container body from a base strip of cardboard, or paper, one face of which is lined with a moisture-impervious liner, comprising the steps of feeding a base strip toward a forming mandrel, bending the edges of said base strip to overlie the strip, helically winding the base strip on said mandrel to form a helical butt seam along said bent edges, and extruding organic thermoplastic material along said helical seam to cover said butt edges.

3. The method according to claim 2 wherein said edges of the base strip are bent 180° so that the edge portions of the unlined face of the strip are juxtaposed.

References Cited by the Examiner
UNITED STATES PATENTS

| | | | |
|---|---|---|---|
| 2,132,239 | 10/38 | Harrison | 93—80 |
| 2,349,730 | 5/44 | Horning. | |
| 2,350,271 | 5/44 | Braloff. | |
| 2,539,450 | 1/51 | Magill. | |
| 2,668,296 | 2/54 | Welch | 156—203 X |
| 2,943,540 | 7/60 | McBain | 156—195 X |
| 2,997,931 | 8/61 | Elam | 93—80 |
| 3,018,212 | 1/62 | Chinn | 156—195 |

FRANK E. BAILEY, *Primary Examiner.*
EARLE DRUMMOND, *Examiner.*